(12) United States Patent
Klingseis

(10) Patent No.: US 7,334,566 B2
(45) Date of Patent: Feb. 26, 2008

(54) METHOD AND DEVICE FOR MONITORING A PULSE CHARGING VALVE OF AN INTERNAL COMBUSTION ENGINE

(75) Inventor: Bernhard Klingseis, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 112 days.

(21) Appl. No.: 10/575,515

(22) PCT Filed: Sep. 27, 2004

(86) PCT No.: PCT/EP2004/052316

§ 371 (c)(1),
(2), (4) Date: Apr. 13, 2006

(87) PCT Pub. No.: WO2005/038211

PCT Pub. Date: Apr. 28, 2005

(65) Prior Publication Data

US 2007/0131201 A1 Jun. 14, 2007

(30) Foreign Application Priority Data

Oct. 13, 2003 (DE) ................................ 103 47 517

(51) Int. Cl.
*F02B 29/08* (2006.01)
*F02D 41/22* (2006.01)
*G01M 15/04* (2006.01)

(52) U.S. Cl. ................ 123/337; 73/118.1; 123/184.53; 123/403; 123/442

(58) Field of Classification Search ..............
123/184.53–184.56, 336, 337, 402–405, 123/442; 73/116, 118.1
See application file for complete search history.

(56) References Cited

U.S. PATENT DOCUMENTS

| 5,143,038 | A | * | 9/1992 | Dahlgren et al. ........... 123/403 |
| 6,422,184 | B1 | * | 7/2002 | Kreuter .................. 123/184.54 |
| 6,810,851 | B2 | * | 11/2004 | Kreuter ...................... 123/337 |
| 2003/0177844 | A1 | | 9/2003 | Schnaibel et al. |

FOREIGN PATENT DOCUMENTS

| DE | 199 50 222 A1 | 4/2001 |
| DE | 102 00 533 A1 | 7/2003 |
| DE | 102 22 202 A1 | 11/2003 |
| EP | 0 521 545 A2 | 1/1993 |
| JP | 61286521 A | 12/1986 |

* cited by examiner

*Primary Examiner*—T. M Argenbright

(57) ABSTRACT

The invention relates to an internal combustion engine comprising a manifold, from which an induction pipe leads to an intake of a cylinder of the internal combustion engine. A gas intake valve is located at the intake of the cylinder. A pulse charging valve is positioned upstream of the gas intake valve in the induction pipe, the latter being released or sealed depending on the selected position of the pulse charging valve. The internal combustion engine is also provided with a pressure sensor, which is located in the induction tract and detects an induction pipe pressure. The progression of the detected induction pipe pressure is compared to that of a reference induction pipe pressure, which characterizes a predetermined operating state of the pulse charging valve. A malfunction of the pulse charging valve is detected depending on said comparison, thus guaranteeing a reliable monitoring of the pulse charging valve.

20 Claims, 4 Drawing Sheets

METHOD AND DEVICE FOR MONITORING A PULSE CHARGING VALVE OF AN INTERNAL COMBUSTION ENGINE

CROSS REFERENCE TO RELATED APPLICATIONS

This application is the U.S. National Stage of International Application No. PCT/EP2004/052316, filed Sep. 27, 2004 and claims the benefit thereof. The International Application claims the benefits of German Patent application No. 10347517.6 filed Oct. 13, 2003. All of the applications are incorporated by reference herein in their entirety.

FIELD OF THE INVENTION

The invention relates to a method and device for monitoring a pulse charging valve of an internal combustion engine, with the pulse charging valve located in an induction pipe.

BACKGROUND OF THE INVENTION

An internal combustion engine is known from DE 102 00 533 A1. It has a manifold, from which an induction pipe leads to an intake of a cylinder of the internal combustion engine. A gas intake valve is located at the intake of the cylinder. A pulse charging valve is located upstream of the gas intake valve in the induction pipe. The pulse charging valve releases or seals the induction pipe as a function of its selected position. An injection valve is also provided, to meter the fuel.

A system for diagnosing incorrect operation of a check valve in an internal combustion engine is known from EP 521 545 A2. The check valve is located in an induction pipe and prevents a backflow of air and/or fuel from the combustion chamber of the internal combustion engine. The system detects a pressure in an induction tract upstream from the check valve and downstream from a throttle valve. The system indicates incorrect operation of the check valve, when an anomalous fluctuation occurs in the detected pressure. The diagnosis is preferably carried out in a predetermined operating state of the internal combustion engine. This predetermined operating state is the idle state of the internal combustion engine at low charge pressure.

The fast-switching pulse charging valves assigned to each cylinder are closed during the first part of the induction sequence, so that a high negative pressure can build up. After approximately half the induction sequence the pulse charging valve—the fast-switching cross-sectional switch—suddenly opens, such that the negative pressure generated in the cylinder during the first part of the induction sequence causes the air/fuel mixture taken in to flow in at a very high speed. The column of intake air flowing very quickly into the combustion chamber of the cylinder of the internal combustion engine produces significant charging effects in the lower and average speed range of the internal combustion engine due to the improved filling characteristic of the respective combustion chamber.

A defect in the pulse charging valve can result in the air mass actually taken in during an induction stroke of a cylinder being smaller than with a correctly operating pulse charging valve. This then causes a change in the actual air/fuel mixture in the cylinder of the internal combustion engine, which can in some instances cause deterioration of the combustion process and increased pollutant emissions.

SUMMARY OF THE INVENTION

The object of the invention is to create a method and device for monitoring a pulse charging valve in an internal combustion engine, which are simple and reliable.

This object is achieved by the features of the claims. Advantageous embodiments of the invention are characterized in the subclaims.

The invention is characterized by a method and corresponding device for monitoring a pulse charging valve in an internal combustion engine with a manifold, from which an induction pipe leads to an intake of a cylinder of the internal combustion engine. The internal combustion engine also has a gas intake valve, which is located at the intake of the cylinder. The pulse charging valve is located upstream from the gas intake valve in the induction pipe and releases or seals the induction pipe as a function of its selected position. A pressure sensor is located in the induction tract and detects an induction pipe pressure.

The invention is based on the knowledge that the progression of the induction pipe pressure detected by the pressure sensor characterizes a possible error in the pulse charging valve.

The invention utilizes this knowledge by comparing the progression of the detected induction pipe pressure with that of a reference induction pipe pressure, which characterizes a predetermined operating state of the pulse charging valve. An error is identified in the pulse charging valve as a function of the comparison.

No additional sensor is therefore required to monitor the pulse charging valve, as a pressure sensor is frequently present anyway for other purposes in the induction tract. Monitoring can therefore take place without significant additional cost.

In an advantageous embodiment of the invention the operating state of the pulse charging valve is the suspension of the pulse charging valve in its open position, the suspension of the pulse charging value in its closed position and/or in a freely oscillating middle position. These operating states occur when there is an error in the pulse charging valve and cause undesirable pollutant emissions.

In a further advantageous embodiment of the invention the progression of the detected induction pipe pressure is compared with that of a reference induction pipe pressure respectively over a cylinder segment of the internal combustion engine. This allows simple direct assignment of an identified error to a specific cylinder of the internal combustion engine, with the result that the control system of the internal combustion engine can take corresponding measures specifically for this cylinder to reduce pollutant emissions.

In an advantageous embodiment of the invention the comparison takes place on the basis of the frequency spectra of the progression of the detected induction pipe pressure and the reference induction pipe pressure. This has the advantage that it is possible to identify the operating state of the pulse charging valve in a very simple and extremely precise manner.

In a further advantageous embodiment of the invention the frequency element(s) characterizing an operating state of the pulse charging valve is/are compared. This has the advantage that the operating state of the pulse charging valve can be determined very precisely thus, whilst at the same time minimizing computation outlay.

It is therefore particularly advantageous, if the frequency range of the natural oscillation of the pulse charging valve is compared for an operating state of suspension of the pulse charging valve in the freely oscillating middle position. The natural frequency of the pulse charging valve is generally significantly higher than that of the regular pressure oscillation in the induction pipe. It can therefore be easily identified on the basis of the frequency spectrum of the progression of the detected induction pipe pressure and then characterizes the suspension of the pulse charging valve in the freely oscillating middle position.

In a further advantageous embodiment of the invention the amplitudes of the frequency spectra are compared. This is particularly simple.

In a further advantageous embodiment of the invention the comparison takes place as a function of the quadratic deviation of the amplitudes of the frequency spectra. This has the advantage that bigger deviations of the progression of the detected induction pipe pressure from that of the reference induction pipe pressure are weighted more heavily, thereby allowing reliable identification of the operating state of the pulse charging valve in a more simple manner.

In a further advantageous embodiment of the invention the comparison takes place as a function of the speed of the internal combustion engine. This has the advantage that characteristic progressions of the reference induction pipe pressure can be provided for the respective speed and more reliable identification of the respective operating state is also possible in the case of digital signal processing with a constant scanning rate.

BRIEF DESCRIPTION OF THE DRAWINGS

Exemplary embodiments of the invention are described in more detail below with reference to the schematic drawings, in which.

Elements with the same structure and function are marked with the same reference characters in all the figures.

DETAILED DESCRIPTION OF THE INVENTION

Figure 1:
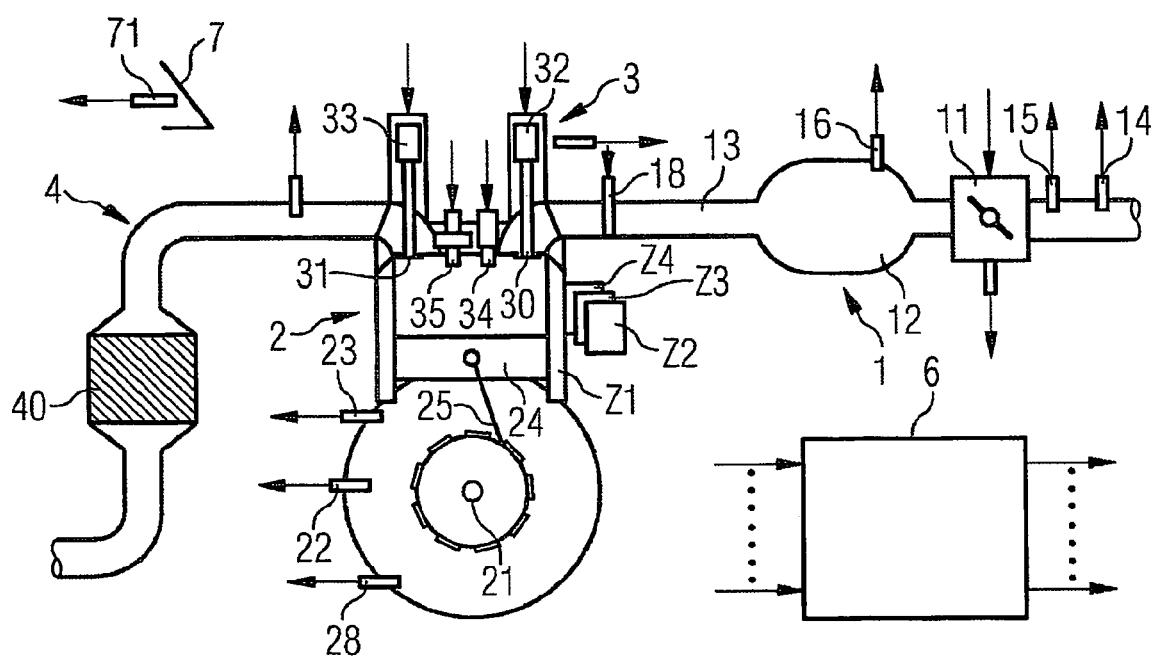
FIG. 1 shows an internal combustion engine with a pulse charging valve 18 and a device for monitoring the pulse charging valve 18.

An internal combustion engine (FIG. 1) has an induction tract 1, an engine block 2, a cylinder head 3 and an exhaust gas tract 4. The induction tract 1 preferably has a throttle valve 11, also a manifold 12 and an induction pipe 13, which leads to a cylinder Z1 via an induction duct into the engine block 2. The engine block 2 also has a crankshaft 21, which is coupled via a connecting rod 25 to the piston 24 of the cylinder Z1.

The cylinder head 3 has a valve gear mechanism with an intake valve 30, an outlet valve 31 and valve drives 32, 33. The gas intake valve 30 and gas outlet valve 31 are preferably driven by means of a camshaft.

The cylinder head 3 also has an injection valve 34 and a spark plug 35. The injection valve 34 can alternatively also be located in the induction duct.

The exhaust gas tract 4 has a catalytic converter 40.

A pulse charging valve 18 is also located in the induction pipe 13 and releases the cross-section of the induction pipe 13 in one selected position, the open position, and seals the cross-section of the induction pipe 13 in a further selected position, the closed position. The pulse charging valve 18 is preferably configured as a spring-mass oscillator, comprising two electromagnets located at a distance from each other, with a coil and core respectively. The valve element of the pulse charging valve 18 is preferably coupled to an armature, the position of which is a function of the current through the coils. If there is no current through either coil, the valve element remains in a middle position, in which the induction pipe is partially released. If there is current through the first coil, the valve element moves to its closed position. If there is current through the second coil, the valve element moves to its open position. If the valve element is in its middle position, it can be caused to oscillate by the air flowing in the induction pipe. These oscillations then have the frequency of the natural oscillation of the spring-mass oscillator.

A control mechanism 6 is also provided, to which sensors are assigned, which detect different measured variables and determine the measured value of the measured variable in each instance. The control mechanism 6 determines manipulated variables as a function of at least one of the measured variables and these are then converted to one or more actuating signals to control the final control elements by means of corresponding actuators.

The sensors are a pedal position sensor 71, which detects the position of an accelerator pedal 7, an air mass sensor 14, which detects an air mass flow upstream from the throttle valve 11, a temperature sensor 15, which detects the induction air temperature, a pressure sensor 16, which detects the induction pipe pressure, a crankshaft angle sensor 22, which detects a crankshaft angle, from which a speed N is then determined, a further temperature sensor 23, which detects a coolant temperature, and yet another temperature sensor 28, which detects an oil temperature. Any sub-set of the said sensors or even additional sensors can be present, depending on the embodiment of the invention.

The final control elements are for example the throttle valve 11, the gas intake and gas outlet valves 30, 31, the injection valve 34, the spark plug 35, the adjustment mechanism 37 and the pulse charging valve 18.

As well as the cylinder Z1, the internal combustion engine can also have further cylinders Z2-Z4, to which corresponding final control elements are similarly assigned.

The pulse charging valve 18 is preferably activated such that it only releases the cross-section of the induction pipe, after the gas intake valve 30 has opened. As a result a negative pressure is generated in the region of the induction pipe between the pulse charging valve 18 and the gas intake valve 13 before the opening of the pulse charging valve 18 due to the induction movement of the piston 24. If the pulse charging valve 18 is then controlled to its open position, the air in the induction pipe upstream from the pulse charging valve 18 flows at very high speed into the combustion chamber of the cylinder Z1 due to the pressure drop. The pulse charging valve is then controlled back to its closed position, in some instances at a time before the gas intake valve 30, producing a charging effect in the cylinder Z1 with suitable activation. This charging effect is very marked, particularly at lower speeds N.

Figure 2:
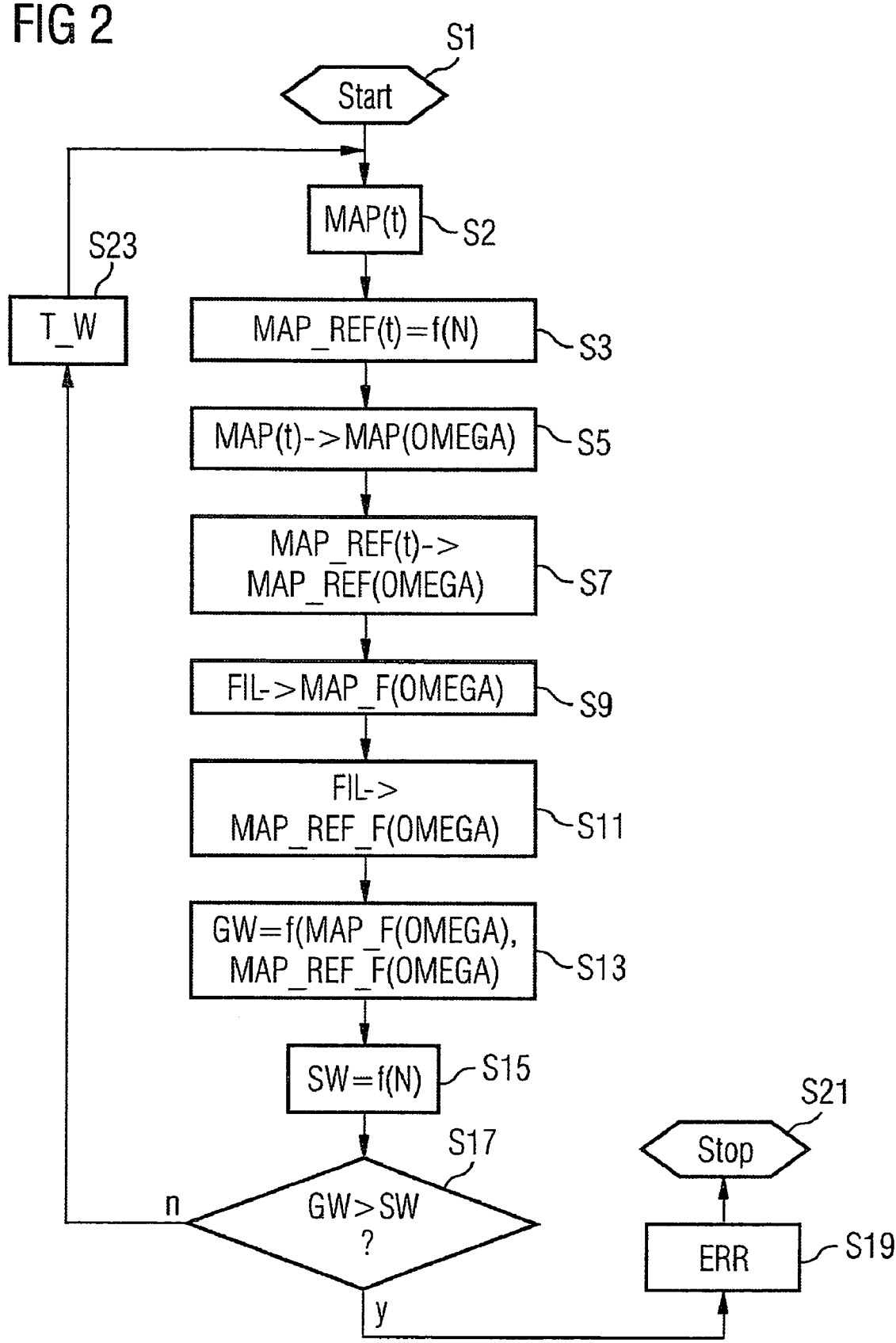
FIG. 2 shows a flow diagram of a program for monitoring the pulse charging valve.

The control mechanism 6 also comprises a device for monitoring the pulse charging valve 18. A program for monitoring the pulse charging valve 18 is started in a step S1 (FIG. 2). Variables are initialized optionally in step S1. The program is preferably started near to the time when the motor of the internal combustion engine is started.

In a step S2 the progression MAP(t) of the detected induction pipe pressure is first detected, preferably over a cylinder segment of the internal combustion engine. A cylinder segment of the internal combustion engine is defined as the crankshaft angle of a working cycle of the internal combustion engine, divided by the number of cylinders of the internal combustion engine. In the case of an internal combustion with four cylinders, a cylinder segment is therefore a 180° crankshaft angle.

In a step S3 a progression MAP_REF(t) of a reference induction pipe pressure is read and preferably stored in a storage unit of the control mechanism 6. The progression MAP_REF(t) of the reference induction pipe pressure is preferably determined as a function of the speed N. Progressions MAP_REF(t) of the reference induction pipe pressure are preferably determined by measurements on an engine test bed or on a vehicle, in which the internal combustion engine is located, or by simulations.

The progression MAP_REF(t) of the reference induction pipe pressure is read separately for each operating state of the pulse charging valve 18 to be investigated. Thus the progression MAP_REF(t) respectively is read, which characterizes suspension in the open position, suspension in the closed position or the continuous middle position of the pulse charging valve 18. The following steps are preferably each passed through in respect of all these operating states and optionally in respect of an operating state of normal operation in each instance, in order to be able to determine the current operating state of the pulse charging valve 18 precisely. The operating state of normal operation is the operating state, in which the pulse charging valve moves to its open position and back to its closed position and back to its open position, such that the required charging effect is achieved in the combustion chamber of the cylinder Z1.

The progression MAP(t) of the detected induction pipe pressure undergoes frequency transformation in a step S5 and the frequency spectrum MAP(OMEGA) of the detected induction pipe pressure is thus obtained.

In a step S7 the progression MAP_REF(t) of the reference induction pipe pressure also undergoes frequency transformation and the frequency spectrum MAP_REF(OMEGA) is thus obtained. Alternatively the frequency spectrum MAP_REF(OMEGA) of the reference induction pipe pressure can also be stored directly in the storage unit of the control mechanism 6.

In a step S9 the frequency spectrum MAP(OMEGA) of the detected induction pipe pressure is filtered. The filter is designed such that the frequency elements that do not characterize the operating state currently being investigated are filtered out. Thus for example, during an investigation relating to the operating state where the pulse charging valve 18 remains in the middle position, all the frequency elements except those in the region of the natural frequency of the spring-mass oscillator are preferably filtered out. This filtering allows a filtered frequency spectrum MAP_F(OMEGA) of the detected induction pipe pressure to be obtained in step S9.

In a step S11 the frequency spectrum MAP_REF(OMEGA) of the reference induction pipe pressure is filtered according to step S9 and a filtered reference spectrum MAP_REF_F(OMEGA) is thus obtained. Alternatively this filtered frequency spectrum MAP_REF_F(OMEGA) can be stored in the storage unit of the control mechanism and then read.

In a step S13 a quality value GW is determined as a function of the filtered frequency spectra MAP_F(OMEGA), MAP_REF_F(OMEGA) of the detected induction pipe pressure and the reference induction pipe pressure. This is preferably determined as a function of the quadratic deviation of the amplitudes of the filtered frequency spectra MAP_F(OMEGA), MAP_REF_F(OMEGA). This has the advantage that bigger deviations are then weighted more than smaller deviations between the amplitudes.

In a step S15 a threshold value SW is determined as a function of the speed N.

In a step S17 it is then verified whether the quality value GW is greater than the threshold value SW. If it is not, the program remains in step S23 for a predetermined waiting period T_W. Alternatively the program can remain in step S23 for a predetermined crankshaft angle in step S23. The dwell time in step S23 is advantageously selected such that steps S2 to S17 are passed through respectively once for each cylinder segment of the internal combustion engine.

If however in step S17 the quality value GW is greater than the threshold value SW, in a step S19 an error state ERR is identified. This may for example be the operating state of suspension of the pulse charging valve 18 in its middle position, suspension of the pulse charging valve 18 in its closed position or its open position.

If the method is implemented once for each cylinder segment of the internal combustion engine, the error can also be assigned in a cylinder-specific manner, in other words assigned to the respective pulse charging valve 18 assigned to the current cylinder Z1 to Z4.

Corresponding emergency operation measures can then also be taken in step S19. These can for example be different metering of the fuel by the injection valves 34 or even limiting of the speed N to a maximum value. The program is then terminated in a step S21.

As an alternative to the described procedure with reference to FIG. 2, the quality value GW can also be determined as a function of the progression over time MAP(t) of the detected induction pipe pressure and the progression over time MAP_REF(t) of the reference induction pipe pressure.

The quality value GW can also be determined by means of a different appropriate function from the quadratic deviation, which represents a measure of the deviation between two progressions.

FIGS. 3, 4, 5 and 6 show the progressions over time MAP_REF(t) of the induction pipe pressure over the crankshaft angle KW for different operating states of the pulse charging valve 18. The duration of a cylinder segment is marked T_SEG. The FIGS. 3-6 respectively also show the cylinders Z1-Z4, which are in the induction tract during the current cylinder segment.

Figure 3:
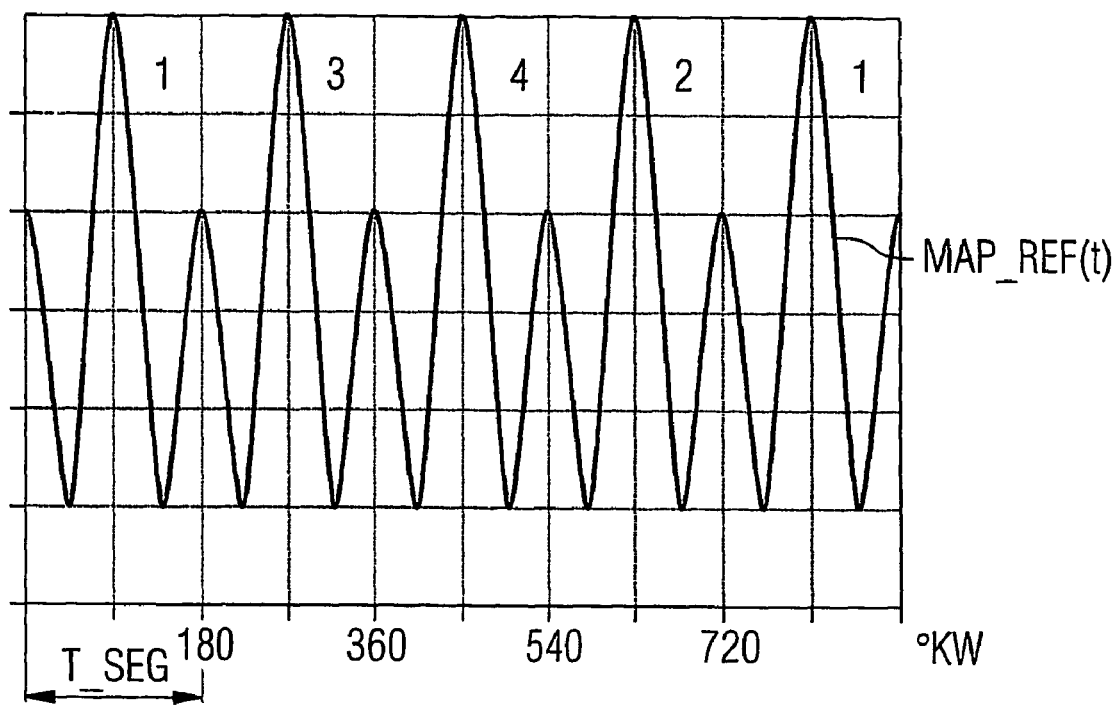
FIGS. 3 to 6 show progressions of an induction pipe pressure detected by a pressure sensor 16 in different operating states of the pulse charging valve 18.
Figure 4:
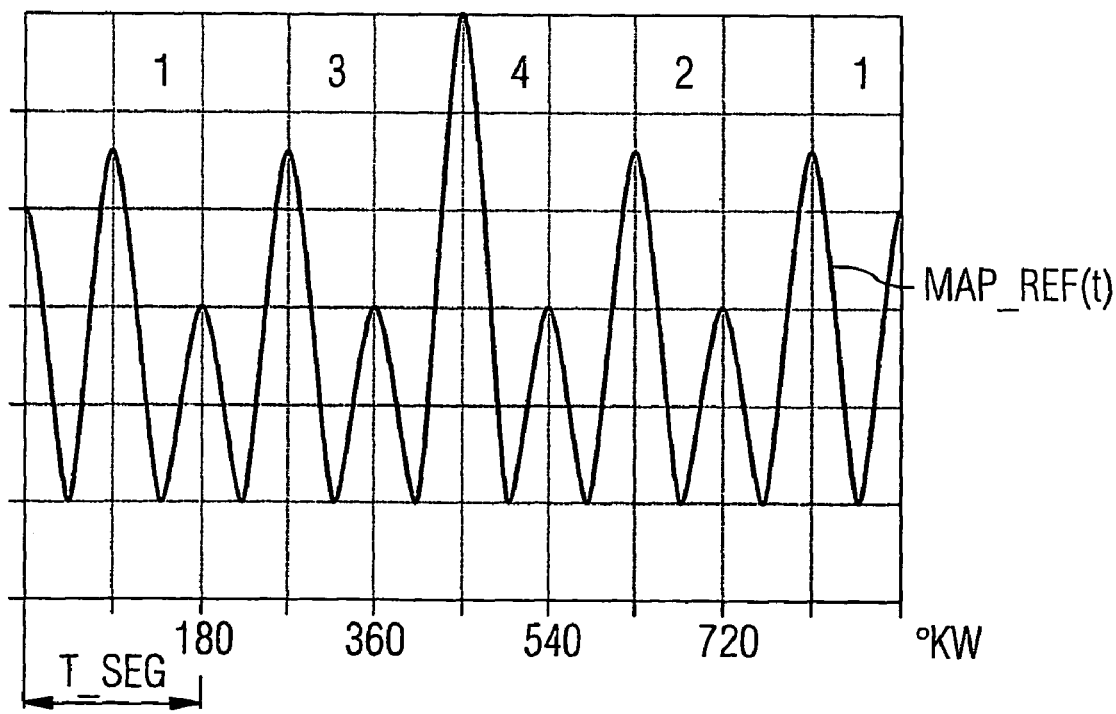
Figure 5:
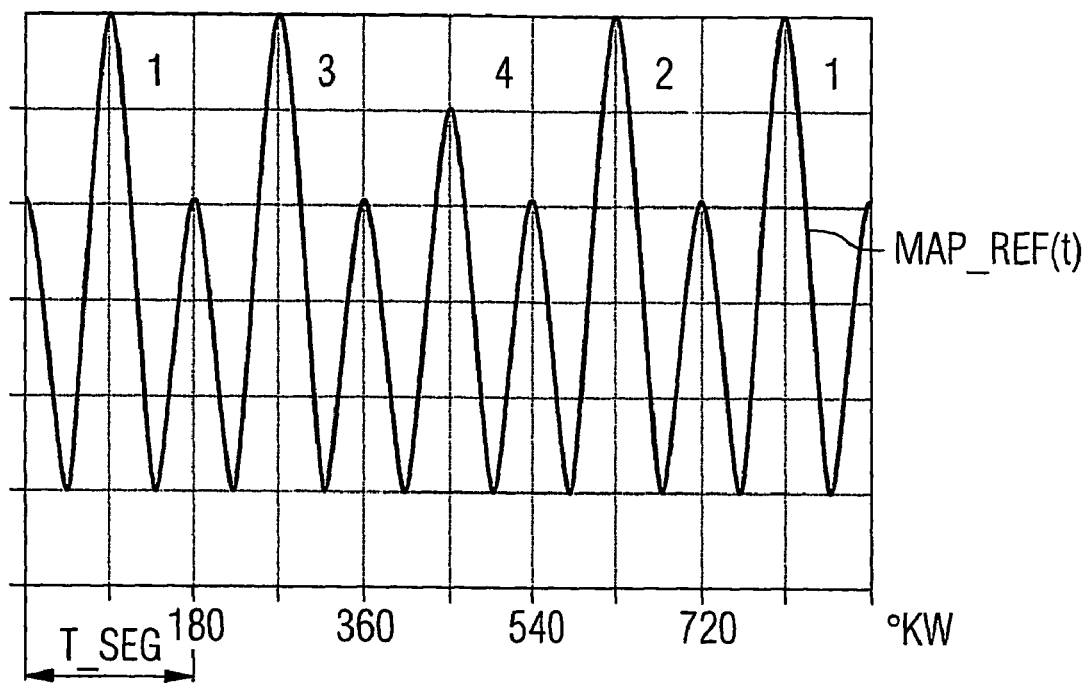
Figure 6:
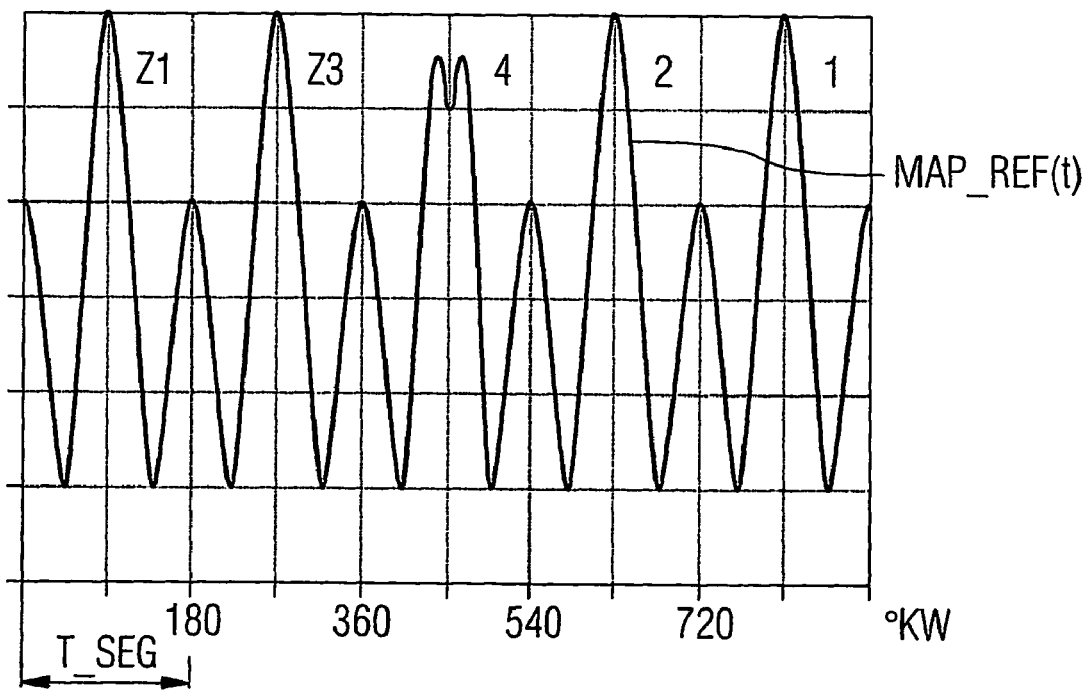

FIG. 3 shows the progression MAP_REF(t) of the reference induction pipe pressure for the operating state of normal operation of the pulse charging valve 18. FIG. 4 shows the progression MAP_REF(t) of the reference induction pipe pressure for an operating state of suspension of the pulse charging valve 18 in the open position. FIG. 5 shows the progression over time MAP_REF(t) of the induction pipe pressure for the operating state of suspension of the pulse charging valve 18 in the closed position. FIG. 6 shows the progression MAP_REF(t) of the induction pipe pressure for the operating state of suspension and therefore free oscillation of the pulse charging valve 18 in the middle position.

The invention claimed is:

1. A method for monitoring a fast-switching pulse charging valve of an internal combustion engine, comprising:
    determining a reference induction pipe pressure profile of an induction pipe of the internal combustion engine, the reference induction pipe pressure profile indicative of an operating state of a pulse charging valve arranged in the induction pipe;

detecting an actual induction pipe pressure profile associated with the induction pipe by pressure sensor;

comparing the actual induction pipe pressure profile with the reference induction pipe pressure profile; and verifying the pulse charging valve is functioning based on the comparison.

2. The method according to claim 1, wherein the operating state of the pulse charging valve is an open position, a closed position or a freely oscillating middle position.

3. The method according to claim 2, wherein the actual induction pipe pressure profile is compared with a reference induction pipe pressure over a cylinder segment of the internal combustion engine.

4. The method according to claim 3, wherein a frequency spectra of the actual induction pipe pressure profile and the reference induction pipe pressure profile are compared to determine the functioning of the pulse charging valve.

5. The method according to claim 4, wherein the frequency spectra of the actual and reference pressure profiles are filtered to provide frequency elements and the frequency elements are compared to determine the proper functioning of the pulse charging valve.

6. The method according to claim 5, wherein an actual natural oscillation frequency of the pulse charging valve is compared with an expected natural oscillation frequency of the pulse charging valve that is determined for an operating state of the pulse charging valve.

7. The method according to claim 6, wherein the operating state of the pulse charging valve is in the freely oscillating middle position.

8. The method according to claim 5, wherein the amplitudes of the frequency spectra of the pressure profiles are compared.

9. The method according to claim 8, wherein the comparison is made as a function of a quadratic deviation of the amplitudes of the frequency spectra.

10. The method according to claim 9, wherein the comparison is made as a function of the rotational speed of the internal combustion engine crankshaft.

11. A device for monitoring a fast-switching pulse charging valve of an internal combustion engine, comprising:

an induction pipe pressure sensor that measures an actual induction pipe pressure profile of an induction pipe of the engine;

a comparator that compares the actual induction pipe pressure profile with a reference induction pipe pressure profile, the reference induction pipe pressure profile representing an induction pipe pressure profile associated with a functioning pulse charging valve; and a verifier that verifies the functioning of the pulse charging valve based on the comparison of the actual and reference pressure profiles.

12. The device according to claim 11, wherein a frequency spectra of the actual induction pipe pressure profile and the reference induction pipe pressure profile are compared to determine the functioning of the pulse charging valve.

13. The device according to claim 12, wherein the frequency spectra of the actual and reference pressure profiles are filtered to provide frequency elements and the frequency elements are compared to determine the proper functioning of the pulse charging valve.

14. The device according to claim 13, wherein an actual natural oscillation frequency of the pulse charging valve is compared with an expected natural oscillation frequency of the pulse charging valve that is determined for an operating state of the pulse charging valve.

15. An internal combustion engine, comprising:

an intake manifold;

an induction pipe connecting the intake manifold to an intake of a cylinder of the internal combustion engine;

a gas intake valve located at the intake of the internal combustion engine cylinder;

a fast-switching pulse charging valve arranged in the induction pipe that seals the induction pipe as a function of a selected position wherein the pulse charging valve is configured as a spring-mass oscillator, comprising two electromagnets located at a distance from each other, with a coil core and armature respectively, and the position of the valve is a function of a control current through the coils;

an induction pipe pressure sensor located in the induction pipe that detects an actual induction pipe pressure; and a comparator that:

compares the actual induction pipe pressure profile with a reference induction pipe pressure profile wherein the a reference induction pipe pressure profile represents a properly functioning pulse charging valve, and identifies the proper functioning of the pulse charging valve based on the comparison of the actual and reference pressure profiles.

16. The internal combustion engine according to claim 15, wherein a frequency spectra of the actual induction pipe pressure profile and the reference induction pipe pressure profile are compared to determine the functioning of the pulse charging valve.

17. The internal combustion engine according to claim 16, wherein the frequency spectra of the actual and reference pressure profiles are filtered to provide frequency elements and the frequency elements are compared to determine the proper functioning of the pulse charging valve.

18. The internal combustion engine according to claim 17, wherein an actual natural oscillation frequency of the pulse charging valve is compared with an expected natural oscillation frequency of the pulse charging valve that is determined for an operating state of the pulse charging valve.

19. The internal combustion engine according to claim 18, wherein the amplitudes of the frequency spectra of the pressure profiles are compared.

20. The internal combustion engine according to claim 19, wherein the comparison is made as a function of a quadratic deviation of the amplitudes of the frequency spectra.

* * * * *